(12) United States Patent
Stratmann et al.

(10) Patent No.: US 8,368,021 B2
(45) Date of Patent: Feb. 5, 2013

(54) METHOD FOR AN IR-RADIATION—BASED TEMPERATURE MEASUREMENT AND IR-RADIATION—BASED TEMPERATURE MEASURING DEVICE

(75) Inventors: Martin Stratmann, Freiburg (DE); Sabine Hinkel, Löffingen-Bachheim (DE); Daniel Auer, Titisee-Neustadt (DE); Patrick Zahn, Buchenbach (DE); Andreas Messerschmid, Bonndorf-Gündelwangen (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 13/073,147

(22) Filed: Mar. 28, 2011

(65) Prior Publication Data

US 2011/0235918 A1    Sep. 29, 2011

(30) Foreign Application Priority Data

Mar. 27, 2010  (DE) .......................... 10 2010 013 142

(51) Int. Cl.
*G02F 1/01*    (2006.01)
(52) U.S. Cl. ...................................................... 250/330
(58) Field of Classification Search .......... 250/330–335, 250/336.1–336.2, 338.1–338.5, 339.01–339.15, 250/340, 341.1–341.8
See application file for complete search history.

(56) References Cited

U.S. PATENT DOCUMENTS

| 5,133,605 | A | 7/1992 | Nakamura |
| 7,003,425 | B2 | 2/2006 | Bird et al. |
| 7,159,824 | B2* | 1/2007 | Geyer et al. ................ 244/158.1 |
| 2007/0152153 | A1* | 7/2007 | Bevan et al. ............... 250/338.1 |

OTHER PUBLICATIONS

Burton, Bernard, Determining Emissivitiy, Instruments Controls and Systems, May 1964, pp. 87-89, vol. 37.

* cited by examiner

*Primary Examiner* — Kiho Kim
(74) *Attorney, Agent, or Firm* — Volpe and Koenig, P.C.

(57) ABSTRACT

In a temperature measuring device (1) an IR-radiation detector (2) and a reference element (3) are provided, connected to a surface (6) of an object (7) in a heat-conducting fashion, with a first area (4) with high emissivity and a second area (5) with high reflectivity formed at the reference element (3), and the IR-radiation detector (2) is equipped for a separate detection of IR-radiation (9, 10, 11) from the first and second areas (4, 5) and a surface area (12) of the object (7). A computer (13) in the IR-radiation detector (2) is equipped to deduct a temperature measurement for the object (7), corrected for emissions and reflections from the detected IR-radiations (9, 10, 11).

11 Claims, 2 Drawing Sheets

METHOD FOR AN IR-RADIATION—BASED TEMPERATURE MEASUREMENT AND IR-RADIATION—BASED TEMPERATURE MEASURING DEVICE

CROSS-REFERENCE TO RELATED APPLICATIONS

This application claims the benefit of German Patent Application No. 10 2010 013 142.3, filed Mar. 27, 2010, which is incorporated herein by reference as if fully set forth.

BACKGROUND

The invention relates to a method for an IR-radiation based temperature measurement at an object.

The invention further relates to an IR-radiation based temperature measuring device having an IR-radiation detector and a reference element.

In radiometric temperature measurements the knowledge of the emission level and the reflected temperature radiation is mandatory in order to avoid faulty measurements. Due to the fact that these parameters are usually known only approximately, they are normally estimated. Frequently tables with estimated values are used for this purpose, and the measurement of emission levels is performed with specialized devices. It is also known to determine the portion of reflected environmental radiation in the form of the reflected temperature using a reference element, which is coated appropriately.

SUMMARY

The invention is based on the object to improve and simplify IR-radiation-based temperature measurements.

In order to attain this object, the invention suggests in a method according to the type mentioned at the outset that a reference element is made to contact the object in a heat-conducting fashion, with the reference element comprises at its surface a first area with high emissivity and a second area with high reflectivity, that a first IR-radiation emitted from the first area of the reference element and a second IR-radiation emitted from the second area of the reference element and a third IR-radiation emitted from a surface area of the object are detected separately, that at least one measurement is determined for the detected IR-radiations, and that from the measurements determined the emissivity of the surface area as well as the portion of the reflected IR-radiation of the object are determined. This way, an automated measurement of the emission level of the object and the reflected environmental radiation can be performed. Preferably, the portion of the reflected IR-radiation is determined as a reflected temperature.

For this purpose, it may be provided that the reflected temperature is determined from the measurements of the first IR-radiation and the second IR-radiation. It may also be provided that an emission coefficient of the object is determined from the measurement of the IR-radiation of the surface area of the object, for example by a comparison with a measurement for the first IR-radiation.

In order to correct measurements it may be provided in the method according to the invention that a temperature of the object is determined from the measurement of the first IR-radiation corrected by the emission coefficient and/or the portion reflected by the environment.

The first, second, and third IR-radiation can be simply determined when the IR-radiations are recorded by taking a thermal image. This way, the individual IR-radiations can be allocated to individual areas of the thermal image, which can be processed separately.

Additionally, it may be provided to take a VIS-image in the visible spectral range corresponding to the thermal image. Here it is advantageous that the VIS-image allows a simple control of the thermal image.

It may be provided that the thermal image and/or the VIS-image is/are rectified prior to further processing. Here, rectifying may relate to correcting perspective distortions of the image recorded. This is advantageous in that processing errors of the recorded images can be avoided. It is further advantageous that after rectification with the VIS-image the thermal image can be easily registered.

After the rectification of the recorded image it may be provided that the corresponding areas, i.e. the first area and/or the second area and/or the surface area are determined in the VIS-image and in the thermal image. This preferably occurs automatically.

For an automated recognition of the reference element in the images recorded it may be provided that the reference element is identified in a recorded image via electronic image-processing means. Here, the identification can be performed by analyzing a recorded thermal image or a recorded VIS-image. Preferably, the image processing means include an algorithm for detecting patterns and/or features by which the reference element can be identified. For a simple identification, a marker may be embodied at the reference element defining a certain feature.

Here it is particularly beneficial when the first area and/or the second area of the reference element can be identified this way.

For a simplified identification it may be provided that a marker is applied to the reference element prior to use, that in a recorded image the marker is identified and localized by electronic image processing means, and that the IR-radiation to be detected of the first area and/or of the second area is/are automatically selected with regards to the marker identified and localized. Here, it is advantageous that the marker serves as a reference point in order to allow localizing and processing the first and/or the second area in the images recorded.

Here, it may be provided that in the infrared spectral range the marker is entirely invisible or at least within the scope of the desired measurement accuracy and thus the measurement of the IR-radiation is not disturbed. Accordingly, the identification of the reference element can be performed via the VIS-image in a measuring channel independent from the IR-radiation-based temperature measurement.

Another optional feature provided by the invention may be that a scope is aligned to the surface area of the object prior to detecting the IR-radiations. This is advantageous in that here the user can directly point to the reference element.

In order to attain this object, the invention provides in a temperature measurement device of the type mentioned at the outset that the reference element comprises at its surface a first area with high emissivity and a second area that is highly reflective, that an IR-detector unit is provided, by which the IR-radiation respectively emitted from the first area and from the second area of the reference element applied to the object and from a surface area of the object can be detected and processed separately, that measurement devices are provided, which are embodied to determine at least one respective measurement from the detected IR-radiation, and that a computer is provided, adjusted to determine the emissivity of the surface area and a reflected portion of the IR-radiation of the object reflected from the environment determined from the measurements. Preferably measurements are deduced from the IR-radiations detected, which correspond to the temperature of the respective IR-radiation. Here, it is advantageous that by using a temperature measuring device embodied according to the invention, temperature measurements are determined and the influences of a previously unknown emission coefficient and an also previously unknown reflected temperature can be automatically corrected in their entirety or to a large extent. Thus, in a simple fashion the temperature measurement device creates the chance to automatically determine temperature values of an object corrected by emissions and reflections.

Here, it is particularly beneficial if the IR-radiation detector is embodied as a thermal-imaging camera.

It may be provided that a VIS-camera is embodied to record a VIS-image. Here, it is advantageous that a recorded thermal image can be controlled using the VIS-image.

In order to allow and/or to facilitate any interference or registration of a recorded VIS-image with a recorded thermal image it may be provided that the image processing means are adjusted to rectify a recorded thermal image and/or a recorded VIS-image.

In order to identify the reference element in the images recorded and to provide the individual areas of the reference element for further processing it may be provided that an image processing means is provided, which is equipped to identify and localize a marker applied to the reference element. Here, the identification can occur by processing a recorded thermal image or a recorded VIS-image.

Here, it is particularly beneficial when the marker defines a feature which can be extracted and identified by an algorithm for detecting a pattern and/or a feature.

In order to disturb the measurement of the IR-radiation as little as possible it may be provided that within the range of measurement accuracy the marker is embodied invisible in the infrared spectral range.

It may further be provided that selection means are embodied adjusted for a manual and/or automatic selection of the IR-radiation to be detected from the first area and/or the second area in reference to the identified and localized marker. For example, this selection may be performed by selecting IR-sensors in an IR-sensor field equivalent to the first area and/or the second area. Here, it is advantageous that the selection and processing of individual areas can be performed automatically. Here, using selection means an automatic selection can occur of the first area, the second area, and/or the surface area or the IR-radiation emitted therefrom towards the temperature measurement device.

This way, the identified and localized marker is used as the reference point, for which the areas of the object are selected. Here, it may be provided for example that a relative image position of the first area and/or the second area is/are saved and provided with reference to the identified and localized marker.

BRIEF DESCRIPTION OF THE DRAWINGS

The invention is now explained in greater detail using exemplary embodiments; however it is not limited to these exemplary embodiments. Additional exemplary embodiments result from combining one or more features of the claims with each other and/or with one or more features of the exemplary embodiments.

Shown in a partially schematic illustration.

DETAILED DESCRIPTION OF THE PREFERRED EMBODIMENT

Figure 2:
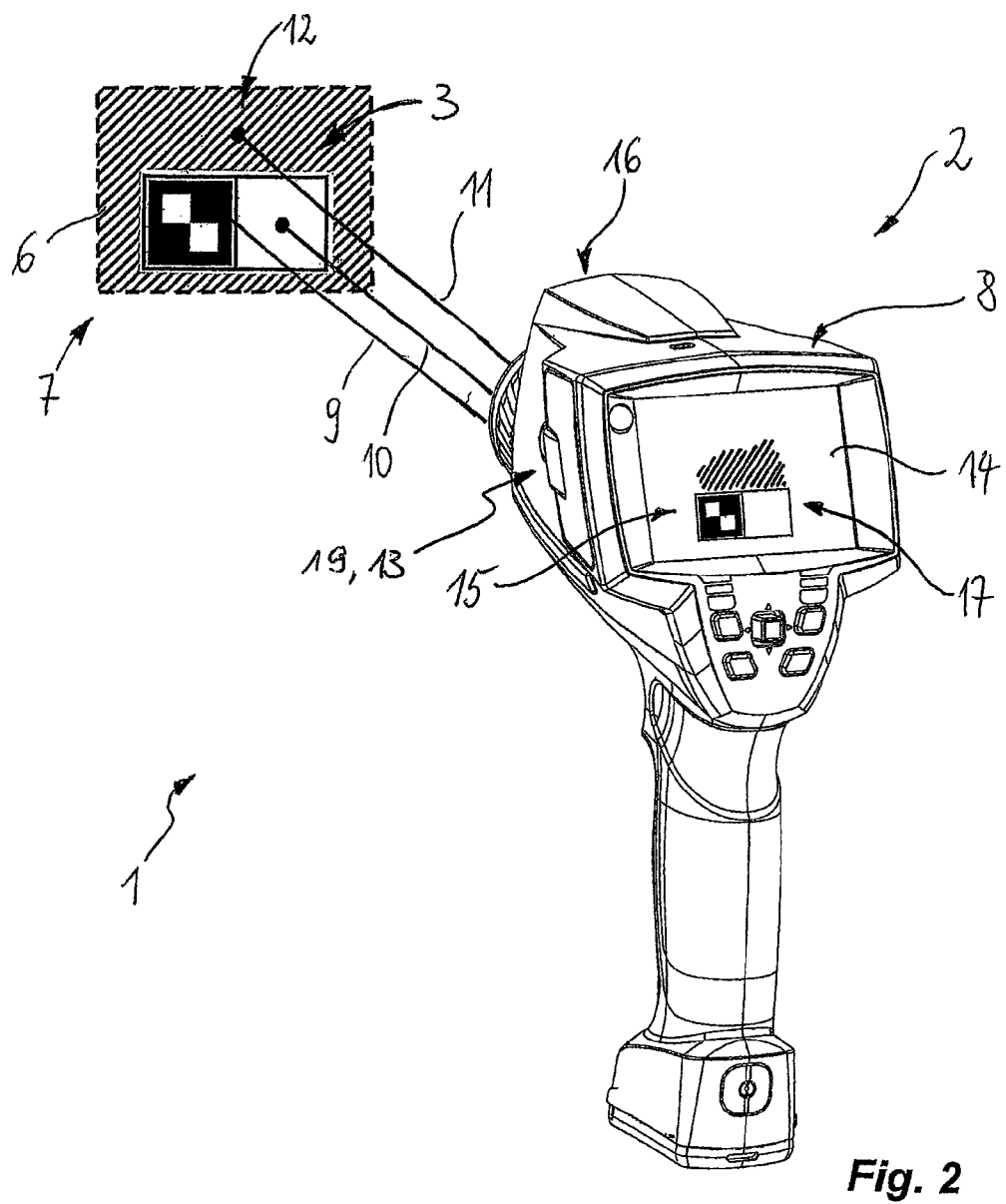
FIG. 2 is a view showing the use of a temperature measuring device in a method according to the invention.

FIG. 2 shows a temperature measurement device, marked 1 in its entirety, which comprises at least an IR-radiation detector 2, embodied as a thermal imaging camera, and a reference element 3.

Figure 1:
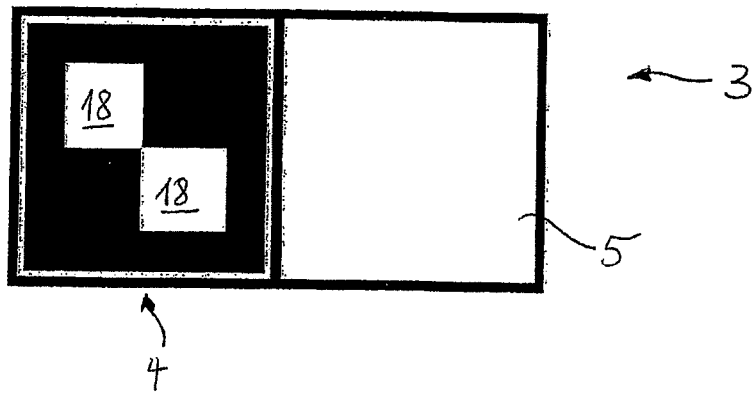
FIG. 1 is a view of a reference element according to the invention.

In FIG. 1 the reference element 3 is shown in greater detail. It comprises in detail a first area 4, provided with a coating and/or made from a material exhibiting high emissivity, thus comprising a high emission coefficient. Further, adjacent to the first area 4, a second area 5 is formed at the reference element 3 which comprises a material having a high reflectivity, i.e. a high reflection coefficient.

In the operational position, the reference element 3 is mounted in a good heat conducting fashion on the surface 6 of an object 7 to be examined.

At its interior the IR-radiation detector 2 includes an IR-detection unit 8, not shown in greater detail and embodied in a known fashion, comprising an IR-sensor field of IR-sensors.

This way, using the IR-radiation detector 2 a first IR-radiation 9 of a first area 4, a second IR-radiation 10 of the second area 5, as well as a third IR-radiation 11 of a surface area 12 of the surface 6 of the object 7 can be detected separately.

Here, the IR-sensors, impinged by the respective IR-radiation 9, 10, 11, form measurement means to detect the IR-radiation 9, 10, 11.

Further, a computer 13 is arranged in the IR-radiation detector 2, which is enabled by suitable programming such that the emissivity of the surface area 12 and a reflected temperature value of the object 7 can be determined based on known physical relationships or saved ones from the measurements determined by the measuring means.

Here, the measurements of the first IR-radiation 9 and the third IR-radiation 11 are referenced in order to determine the emission coefficient of the surface 6, and a reflected temperature value is deducted from the measurement of the second IR-radiation 10, which describes the portion of reflected IR-radiation, i.e. the IR-radiation not determined by the intrinsic temperature of the object 7 but irradiated by the environment of said object 7 and reflected thereby.

The computer 13 is further equipped such that it can determine the temperature of the object, corrected by an emission coefficient and/or the reflected temperature value, using the measurement of the first IR-radiation 9 or the measurement of the third IR-radiation 11.

The IR-radiation detector 2 further comprises a display device 14, at which a thermal image 15 of the object 7, recorded by the IR-detection unit 8, can be displayed with the reference element 3.

Further, the measurements determined and/or measured can be shown at the display device 14.

The IR-radiation detector 2 further comprises a VIS-camera 16, by which a VIS-image 17 of the object 7, corresponding to the thermal image 15, can be recorded and optionally be output at the display device 14.

In order to allow localizing the reference element 3 and its areas 4 and 5 and/or the surface area 12 in the thermal image 15 and/or the VIS-image 17, a marker 18 is formed at the reference element 3, which defines a feature that can be processed in the image analysis and/or image processing.

Electronic image processor 19 is implemented in the IR-radiation detector 2, not shown in greater detail, which realize an algorithm to detect patterns and/or features by which the marker 18 and/or the feature defined thereby can be identified and localized in the thermal image 15 or the VIS-image 17.

Here, in one exemplary embodiment the marker 18 is only discernible in the visible spectral range and invisible in the infrared spectral range within the scope of the desired measurement accuracy. In this case, the algorithm for detecting patterns and/or features is applied to the VIS-image 17 recorded.

If the thermal image 15 is directly processed via the image processor 19, the marker 18 must be embodied visibly in the infrared spectral range.

Additionally, a scope, not shown in greater detail, may be provided at the IR-radiation detector 2 as well, for example a Laser pointer, by which the reference element 3 is located.

The image processor 19 further comprises programs, by which the recorded thermal image 15 and/or the recorded VIS-image 17 can be rectified prior to further processing.

After the identification and localization of the marker 18 in the thermal image 15 and/or the VIS-image 17, said marker 18 can be used as a reference point, in regards to which the image positions of the areas 4, 5, 12 in the recorded image 15, 17 can be determined.

When the areas 4, 5, 12 in the recorded image 15, 17 have been localized the allocated IR-radiations 9, 10, 11 can be determined by recording the measurements of the respective IR-sensors. The desired corrected temperature value results from a comparison of the respective temperature values.

Figure 3:
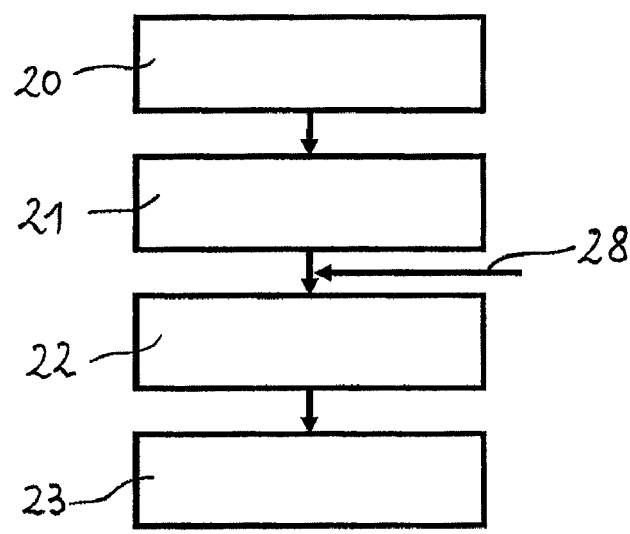
FIG. 3 is a diagram showing a method according to the invention.

Therefore, the method according to the invention is performed in an exemplary embodiment following a simplified diagram according to FIG. 3.

First, a thermal image 15 is recorded in a thermal imaging step 20 using the IR-radiation detector 2. In a reference element-identification step 21 then the image position of the reference element 3 in the thermal image 15 is determined. Subsequently, in a measurement step 22, one measurement each is determined for the IR-radiations 9, 10, 11.

From the measurements determined, an emission coefficient, a value for the reflected temperature, and an emission and reflection-corrected temperature value is determined in a processing step 23.

Figure 4:
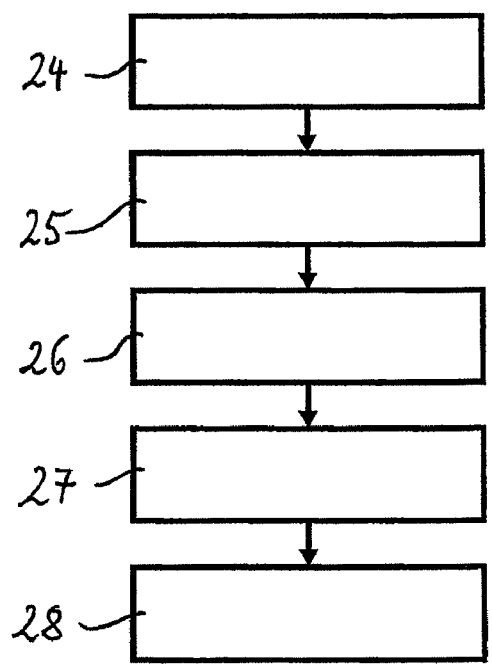
FIG. 4 is a diagram showing another method according to the invention.

FIG. 4 shows a variant of a method according to the invention in which first a VIS-image 17 and a thermal image 15 are recorded in an image recording step 24.

Subsequently, in a reference element-identification step 25 the image position of the reference element 3 is determined in the VIS-image 17.

Now, in a distance determination step 26, the distance from the object 7 is determined from the shape and/or size of the illustration of the reference element 3 in the VIS-image 17.

In a reference element-localization step 27, the image position of the reference element 3 in the recorded thermal image corresponding to the VIS-image 17 is determined from the determined distance.

Using the position of the reference element 3 in the thermal image 15, determined this way at the leap point 28, the method according to FIG. 3 can be continued.

In the temperature measurement device 1, an IR-radiation detector 2 and reference element 3 are provided, connected to a surface 6 of an object 7 in a good heat-conducting fashion, with at the reference element 3 a first area 4 with high emissivity and a second area 5 with high reflectivity being embodied and the IR-radiation detector 2 being equipped for separately recording IR-radiation 9, 10, 11 of the areas 4, 5 and a surface area 12 of the object 7, with in the IR-radiation detector 2, a computer 13 being embodied, which is designed to deduce a temperature measurement, corrected for emissions and reflections, for the object 7 using recorded IR-radiations 9, 10, 11.

The invention claimed is:

1. A method for an IR-radiation-based temperature measurement in an object (7), comprising contacting the object (7) with a reference element (3) in a heat-conducting fashion, with the reference element (3) having a surface comprising a first area (4) and a second area (5), with the first area (4) having a higher emissivity than the second area, and the second area (5) having a higher reflectivity than the first area (4), separately detecting a first IR-radiation (9) emitted by the first area (4) of the reference element (3), a second IR-radiation (10) emitted by the second area (5) of the reference element (3), and a third IR-radiation (11) emitted by a surface area (12) of the object (7), determining at least one measurement each from the IR-radiations (9, 10, 11) detected, and determining an emissivity of the surface area (12) as well as a portion of the reflected IR-radiation of the object (7) from the measurements, and at least one of the first area (4) or the second area (5) of the reference element (3) can be identified with an electronic image processor (19) with an algorithm for detecting at least one of patterns or features in a recorded image (15, 17).

2. The method according to claim 1, wherein a temperature of the object (7) is determined from the measurement of the first IR-radiation (9), corrected by at least one of an emission coefficient or the portion reflected by the environment.

3. The method according to claim 1, wherein the first, second and third IR-radiations (9, 10, 11) are detected by recording at least one of a thermal image (15) or recording a VIS-image (17) corresponding to the thermal image (15) in a visible spectral range.

4. The method according to claim 3, wherein at least one of the thermal image (15) or the VIS-image (17) are rectified prior to further processing, and corresponding ones of the first area, the second area and the surface area (4, 5, 12) are determined in the VIS-image (17) and the thermal image (15).

5. The method according to claim 1, wherein prior to use the reference element (3) is provided with a marker (18) for defining a feature, the marker (18) is identified and localized with an electronic image processor (19) in a recorded image (15, 17), the IR-radiation (9, 10) to be detected from at least one of the first area (4) or the second area (5) is selected in reference to the identified and localized marker (18).

6. The method according to claim 1, wherein prior to detecting the IR-radiations (9, 10, 11) a scope is aligned to at least one of the surface area (12) of the object (7) or the reference element (3).

7. An IR-radiation based temperature measuring device (1), comprising an IR-radiation detector (2) and a reference element (3), the reference element (3) has a surface comprises a first area (4) and a second area (5), the first area (4) having a higher emissivity than the second area (5), and the second area (5) having a higher reflectivity than the first area (4), an IR-detector unit (8) is provide, by which IR-radiation (9, 10, 11), respectively emitted by the first area (4) and the second area (5) of the reference element (3) applied to the object (7) and by a surface area (12) of the object (7) is separately recorded and evaluated, a measuring device that determines at least one measurement each from the detected IR-radiations (9, 10, 11), and a computer (13) equipped to determine an emissivity of the surface area (12) and a portion of the IR-radiation reflected by the environment of the object (7) using measurements determined, and an image processor (19) is provided for identifying and localizing a marker (18) applied on a reference element (3) and the marker (18) defines a feature.

8. The temperature measuring device (1) according to claim 7, further comprising at least one of a VIS-camera (16) adapted to record a VIS-image (17) or an image processor (19) to rectify at least one of a recorded thermal image (15) or a recorded VIS-image (17).

9. The temperature measuring device (1) according to claim 7, wherein the marker (18) is embodied invisible in an infrared spectral range.

10. The temperature measuring device (7) according to claim 7, wherein selection means are provided, which are adapted to manually or automatically select IR-radiation (9, 10) to be detected from at least one of the first area (4) or the second area (5) in reference to the identified and localized marker (18).

11. The temperature measuring device (7) according to claim 10, wherein the selection means are adapted to select IR-sensors in an IR-sensor field equivalent to at least one of the first area (4) or the second area (5), and at least one of a relative image position of the second area (4) or the second area (5) is adapted to be stored or provided in reference to the identified and localized marker (18).

\* \* \* \* \*